Nov. 25, 1924.

E. W. SAUNDERS 1,516,503

WINDSHIELD FOR VEHICLES

Filed March 9, 1923     4 Sheets-Sheet 1

INVENTOR
Edward W. Saunders.
By Bakewell & Church
ATTORNEYS

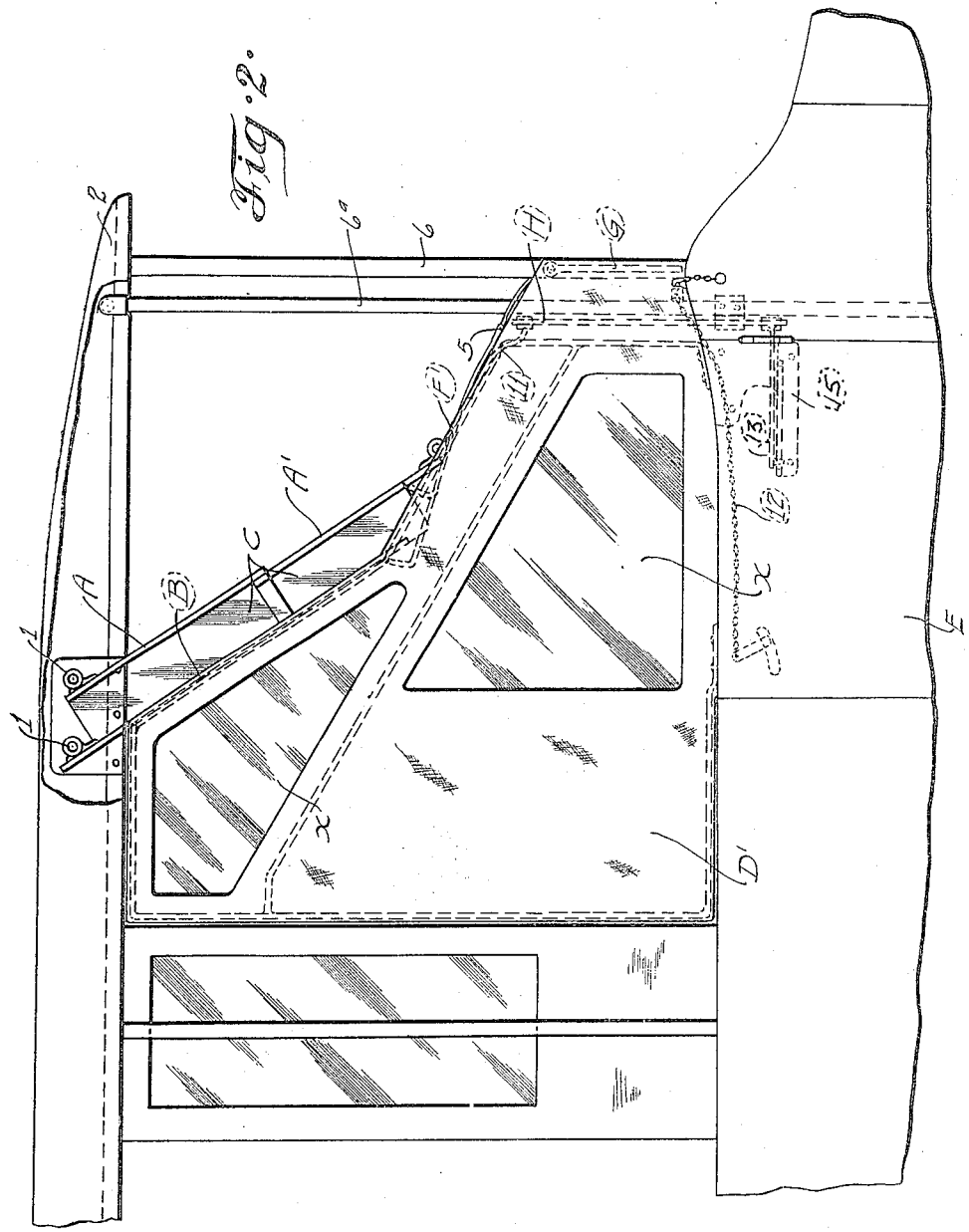

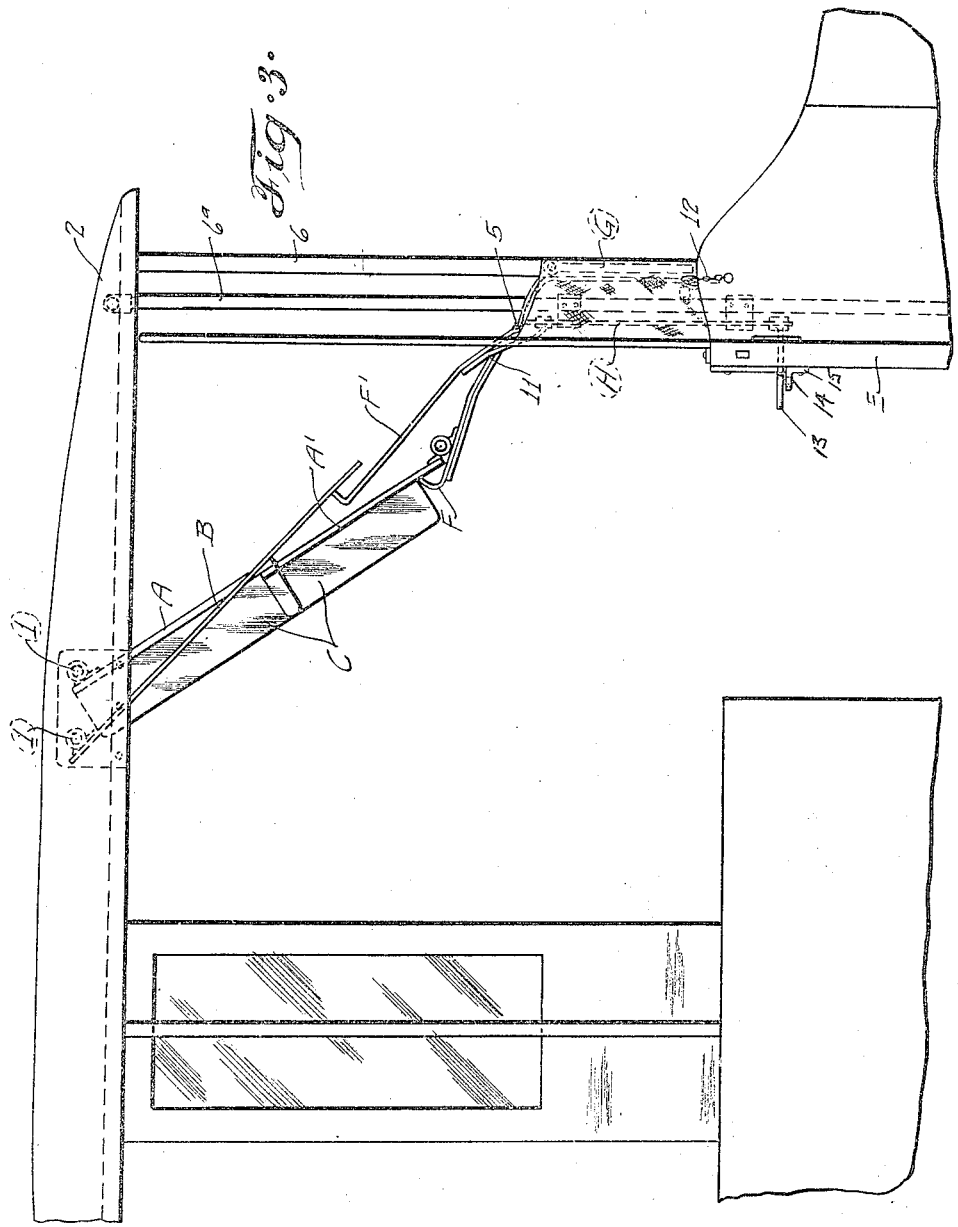

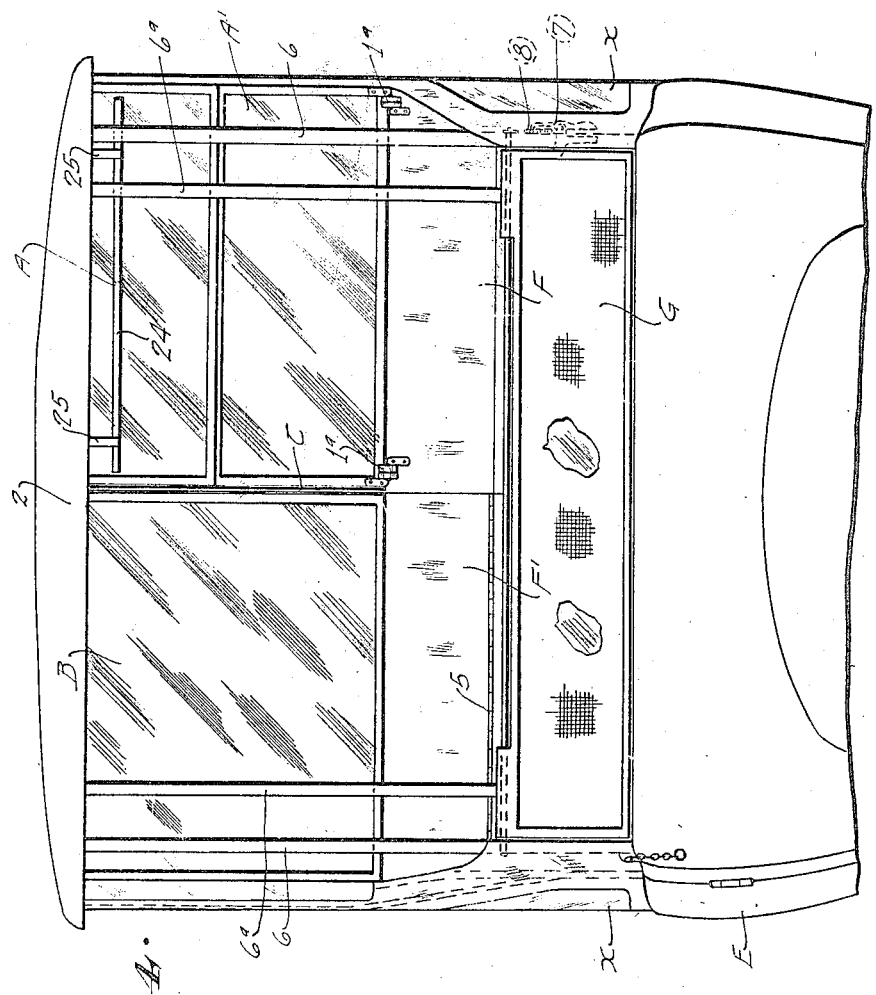

Patented Nov. 25, 1924.

1,516,503

UNITED STATES PATENT OFFICE.

EDWARD W. SAUNDERS, OF ST. LOUIS, MISSOURI.

WINDSHIELD FOR VEHICLES.

Application filed March 9, 1923. Serial No. 623,945.

*To all whom it may concern:*

Be it known that I, EDWARD W. SAUNDERS, a citizen of the United States, residing at St. Louis, Missouri, have invented a certain new and useful Improvement in Windshields for Vehicles, of which the following is a full, clear, and exact description, such as will enable others skilled in the art to which it appertains to make and use the same.

This invention relates to wind shields for vehicles.

The various kinds of wind shield that are now used on automobiles and other conveyances are composed of one or more glass panels arranged a considerable distance in front of the occupants of the front seat of the vehicle. Such wind shields are dangerous, because of the possibility of the glass breaking and cutting the occupants of the front seat in the event of a collision or accident to the vehicle, and they interfere somewhat with the vision of the operator in charge of the vehicle, on account of the relatively great distance between the glass and the operator's eyes. In automobiles of the closed type the relatively wide stanchions at the ends of the wind shield obstruct the operator's view to the right and to the left, and in bodies of the open or touring type the front door curtains that have to be used in inclement weather make it extremely difficult to see the vehicles that are approaching or which are being approached at an angle.

One object of my invention is to provide a vehicle wind shield that is safe and of such construction that it affords less obstruction to the vision of the operator in charge of the vehicle than the various kinds of wind shields now used on vehicles.

Another object is to provide a storm front for vehicles that affords adequate protection for the occupants of the front seat in inclement weather, and which is of such construction that the operator in charge of the vehicle has an unobstructed view to the right and to the left.

And still another object is to provide a vehicle wind shield having the desirable characteristics above referred to whose parts can be adjusted easily to ventilate the vehicle or to arrange them in an inoperative position out of the way of the occupants of the front seat. Other objects and desirable features of my invention will be hereinafter pointed out.

To this end I have devised a wind shield or storm front for vehicles which is composed of a non-frangible, transparent means arranged transversely of the vehicle in front of the occupants of the front seat in close proximity to their faces, means for protecting the bodies of said occupants from injury caused by flying glass in the event the vehicle collides with another vehicle equipped with a conventional glass wind shield and side closures for the front seat compartment. Said transparent, non-frangible means can be formed in various ways without departing from the spirit of my invention, but it preferably comprises separate portions arranged in front of the occupants of the front seat in close proximity to their faces and constructed of transparent celluloid, wire glass or a laminated structure formed from pieces of glass or celluloid combined in such a way that even if the glass breaks the celluloid will prevent the pieces of glass from separating or falling, and thus injuring the occupants of the front seat, the term "non-frangible," as herein used, applying to any substances or material that will not break easily, and which, in the event of rupture, will not fall apart or produce the disastrous result that is apt to occur when a glass panel is subjected to a blow that fractures same and causes pieces of glass to fly in all directions. In the form of my invention herein illustrated the two separate portions just referred to are so constructed and arranged that the driver has an unobstructed view to the right and to the left and said portions are capable of being adjusted independently of each other for a purpose hereinafter decribed. The means that is used to protect the bodies of the occupants of the front seat from injury caused by flying glass may also be constructed in various ways, but it preferably comprises transversely-disposed members arranged between the cowl of the vehicle body and the transparent, non-frangible means previously referred to and constructed in such a way that they will intercept pieces of flying glass that pass over the cowl of the body. The side closures for the front seat compartment can be constructed in various ways, but it is preferable to provide the one at the left of the driver with an adjustable window and connect the other side closure to the right hand door of the front seat compartment.

Figure 1 of the drawings is an elevational view of the left hand side of a vehicle body equipped with a wind shield or storm front constructed in accordance with my invention.

Figure 2 is an elevational view of the right hand side of said body.

Figure 3 is a view similar to Figure 2, with the right hand door of the front seat compartment open; and Figure 4 is a front elevational view of the vehicle body.

Figure 1:
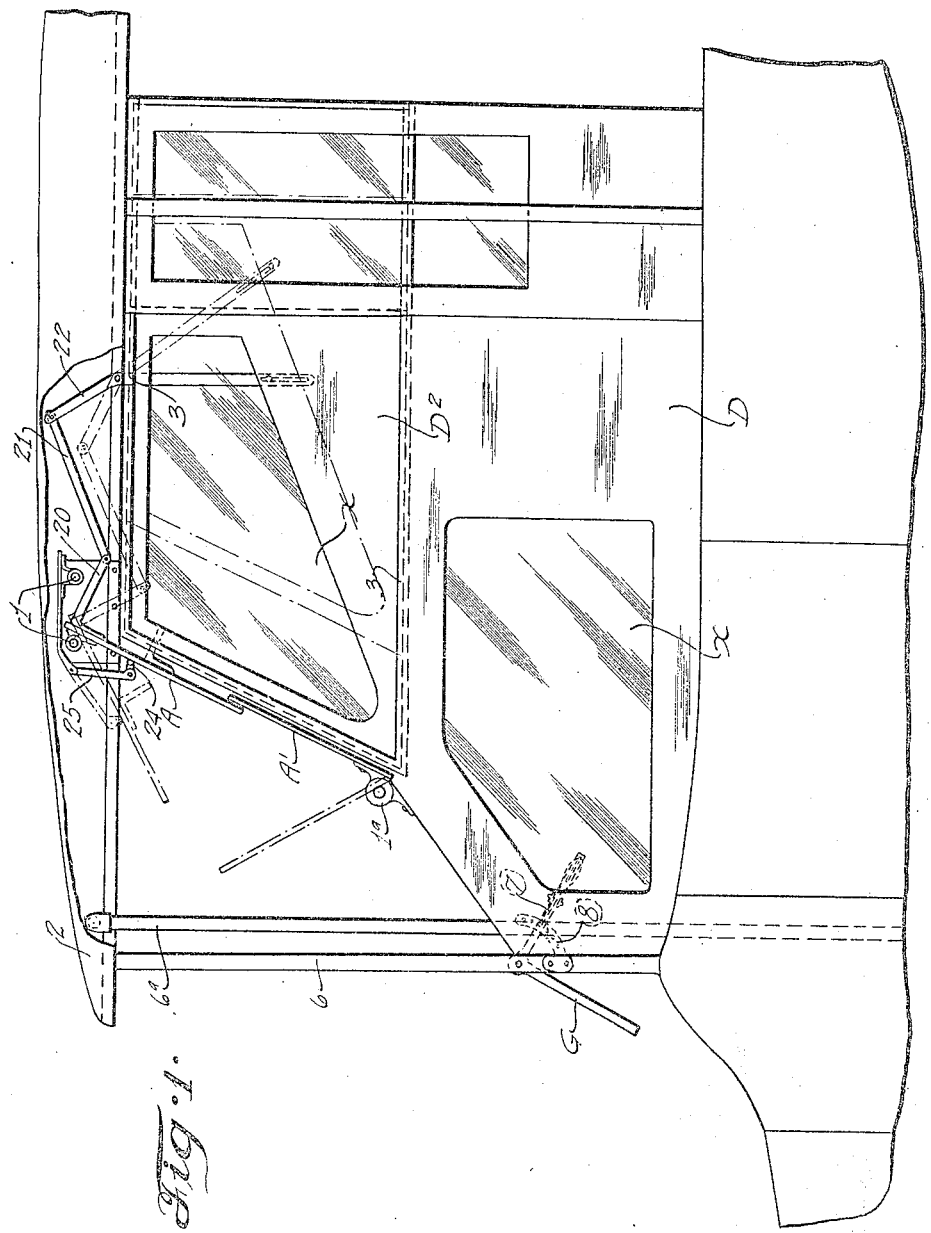

Referring to the drawings which illustrate the preferred form of my invention, A and A' designate two transversely-disposed, transparent panels arranged in front of the operator in charge of the vehicle in comparatively close proximity to his face and B designates a transversely-disposed, transparent panel arranged in front of the other occupant of the front seat. The panels A and A' are mounted in such a way that they can be arranged in overlapping relation and in an inclined position, as shown in full lines in Figure 1, when it is desired to prevent wind from blowing into the front seat compartment, or swung forwardly into the position shown in broken lines in Figure 1, when it is desired to have an open space in the shield through which the operator can look straight ahead. The panel B is mounted in such a way that it can be arranged in parallel relation to the panels A and A' slightly to the rear of same, as shown in Figure 2, or swung upwardly slightly into the position shown in Figure 3, when the right hand door of the front seat compartment is open, the purpose of mounting the panel B in this manner being to provide an unobstructed view for the driver to the right when the front seat compartment is closed and facilitate the entrance and exit to and from said compartment when the right hand door of same is open. The panels A and B are hinged at their upper edges and are retained in adjusted position by retaining devices 1 of any suitable kind that are arranged in proximity to the roof or top 2 of the vehicle body. Normally, the panels A, A' and B are so arranged with relation to each other that the panel B is positioned slightly to the rear of the panels A and A'. Thus, there is formed a space at the right hand end of the panels A and A' through which the driver has an unobstructed view to the right. In order to close said space and prevent wind, rain, snow and the like from beating into the front seat compartment, a vertically-disposed, transparent panel or two overlapping panels C are arranged at the right hand end of the panels A and A', as shown in Figures 2 and 3.

As previously stated, side closures are provided for the front seat compartment. The style or kind of side closures that are used is immaterial, but I prefer to use a stationary closure D for the left hand side of said compartment and a movable closure D' for the right hand side of said compartment, the closure D' being carried by the right hand door E of the front seat compartment of the vehicle. The closures D and D' are provided with pieces of transparent material $x$ arranged so as to permit the occupants of the front seat to see to the right and to the left, and if desired, the left hand side closure D can be provided with a movable window $D^2$, herein illustrated as a sliding panel that slides in guides 3 carried by the closure D, as shown in Figure 1. In inclement weather, when the panels A and A' in front of the driver are coated with snow or moisture, the driver can open the window $D^2$ when he approaches an intersection in the highway, in the event he cannot see clearly through the transparent panels of the shield. In most instances, however, the driver has an unobstructed view to the right through the panels C and an unobstructed view to the left through the transparent panel $x$ in the window $D^2$, due to the fact that these panels are so disposed that snow and moisture do not collect on same to such an extent as to seriously interfere with the vision of the driver. The panel A is preferably combined with the window $D^2$ in such a way that when said panel A is swung upwardly, as shown in broken lines in Figure 1, the window $D^2$ will be moved rearwardly into the position shown in broken lines in said figure. This can be accomplished in various ways, but one construction which I have found to be very efficient consists of a rigid arm 20 on the panel A, as shown in Figure 1, connected by a link 21 with a lever 22 that is joined by a slot and pin connection with the window $D^2$. When the panel A is raised the window $D^2$ will be opened automatically, and when said panel is lowered, the window $D^2$ will be closed automatically. Another feature of my wind shield or storm front that is novel is a wiping device 24 arranged transversely on the front side of the panel A in such a way that when said panel A is swung upwardly into the position shown in broken lines in Figure 1, the wiping device 24 will move over the panel A towards the lower edge of said panel, and thus remove or scrape off snow, rain or the like which may have collected in the front side of said panel. In the form of my invention herein illustrated the wiping device 24 is carried by a pair of hinged arms 25 arranged so that gravity maintains the wiping device 24 in engagement with the front side of the panel A.

In order to protect the occupants of the front seat from pieces of glass that might be thrown into the front seat compartment in the event of a collision between the vehicle and another vehicle equipped with a conventional glass wind shield, guards F and F' are arranged transversely of the vehicle in front of and at a point below the panels A' and B, the guard F being stationary and the guard F' having its front edge connected to a hinge 5, so as to permit it to swing upwardly out of the way when the right hand front door E is opened. The front edges of said guards are arranged some distance above the cowl of the vehicle body, and a movable panel G is provided for closing the space between said guards and cowl, the panel G herein shown being pivotally mounted on vertical stanchions 6, so that it can be swung forwardly into the position shown in Figure 1 when it is desired to ventilate the front seat compartment and being provided with an operating handle 7 arranged so that it can be grasped easily by the driver. The particular construction of the panel G is immaterial, but it is preferably composed of a frame that contains a piece of wire netting over which a piece of fabric is stretched. A locking device 8 co-operates with the handle 7 to hold the panel G in adjusted position.

Any suitable means can be used for retaining the panels A and A' in adjusted position, such as friction or ratchet holding devices 1ª arranged adjacent the hinged lower edge of the panel A' and similar devices 1 arranged adjacent the hinged upper edge of the panel A and a manually operated means or an automatic means can be provided for raising and lowering the panel B, as previously described. Preferably, a vertically-disposed operating shaft H is combined with the right hand door E of the front seat compartment in such a way that when said door is opened the shaft H will actuate a device that causes the panel B to swing upwardly into the position shown in Figure 3, said device consisting of a laterally-projecting arm 11 on said shaft that engages the guard F' and swings it upwardly, thereby causing the upper end of said guard to strike against the panel B and move it upwardly. From the foregoing it will be seen that although the panel B and the guard F' normally occupy such a position that they interfere with the entrance or exit of passengers to or from the front seat compartment of the vehicle, the operation of opening the front door E causes said parts to move out of the way and the operation of closing said door causes said parts to be restored to their normal position. In the drawings the reference character 12 designates a chain or the like that is used for operating the inside handle of the door E from a point outside of the vehicle when said door is closed, and the reference character 6ª designates stationary uprights that tend to reinforce and strengthen the top of the vehicle, and thus protect the occupants of the front seat in the event the vehicle turns over.

Due to the fact that the panels A and B in front of the occupants of the front seat of the vehicle are arranged very close to the eyes of said occupants, said panels interfere less with the vision of the persons looking through same than the conventional vehicle wind shield which is arranged a considerable distance in front of the occupants of the front seat of the vehicle and the transparent panels C and *x* at the ends of the panels A and A' permit the driver to see clearly to the right and left, even though the panels A and A' are covered with snow or rain. If desired, said panels A and A' can be swung forwardly, so as to produce a clear vision slot between said panels through which the driver has an unobstructed view straight ahead, the forward movement of the panel A causing a wiping device 24 to clean off the front side of said panel. Moreover, such a wind shield or storm front eliminates the possibility of the occupants of the front seat being cut by flying glass in the event of a collision or accident to the vehicle, as the panels A, A' and B of the shield are non-frangible and the guards F, F' and G prevent pieces of glass from being thrown into the front seat compartment over the cowl of the vehicle body. The transversely-disposed panel G that is arranged between the front edge of the guards F and F' and the cowl of the vehicle body can be adjusted either to permit air to circulate through the space between said parts, or adjusted into such a position that it serves as a closure for said space, and the guard F' and panel B are so constructed that they will move automatically out of the way when the right hand front door is opened.

In the form of my invention herein shown the shaft H is provided at its lower end with an arm 13 equipped with a pin 14 that projects into a slot in a bracket 15 on the door E, as shown in Figures 2 and 3, so as to cause said shaft to turn in opposite directions when said door is opened and closed, but it will, of course, be understood that it is immaterial what means is used for operatively connecting the shaft H with the door E.

Having thus described my invention, what I claim as new and desire to secure by Letters Patent is:

1. A wind shield for vehicles, comprising a plurality of independently-adjustable, transparent, non-frangible panels arranged in front of the occupants of the front seat of the vehicle in proximity to their faces, guards projecting forwardly from the lower edges of said panels towards the cowl of the vehicle for intercepting pieces of broken glass or other objects that are thrown over said cowl, and means for simultaneously changing the position of the panel and guard in front of the passenger of the front seat to facilitate entrance to or exit from the vehicle.

2. An automobile body provided with a front seat compartment, a door for said compartment, a storm front or wind shield for said compartment comprising transparent portions arranged transversely of the body in close proximity to the occupants of said compartment and mounted to swing on horizontal axes, and means operated by the movement of the door for swinging certain elements of said storm front so as to provide for easy entrance and exit of passengers to and from said compartment.

3. An automobile body provided with a front seat compartment, a door for said compartment, a swinging panel and swinging guard arranged in overlapping relation in front of the occupant of said compartment who sits near said door, means for moving said panel and guard into an inoperative position when said door is opened so as to provide easy entrance and exit to and from said compartment, and a protecting means arranged in front of the driver composed of two swinging panels that can be moved into a position to provide an unobstructed view straight ahead for the driver.

4. An automobile body provided with a front seat compartment, a pair of pivotally mounted panels arranged in an inclined position in front of the driver, an independent hinged panel arranged in front of the passenger of said compartment, guards arranged transversely of said compartment for closing the space between the cowl and said panels, the guard in front of the passenger being hinged at its front edge, a door for said compartment, and means operated by said door for swinging the hinged guard and panel into an inoperative position when the door is opened.

5. An automobile body provided with a front seat compartment, side closures for said compartment, one of which closures is provided with a movable window arranged at the left of the driver, a forwardly-inclined, adjustable panel arranged in front of the driver, means operated by the movement of said panel for opening and closing said window, and a panel arranged in front of the passenger seated beside the driver and so disposed with relation to the panel in front of the driver that the driver has an unobstructed view to the right.

6. An automobile body provided with a front seat compartment, an adjustable transparent panel arranged in front of the driver, a side closure for said compartment provided with a movable window, and means for causing said window to open automatically when said panel is swung upwardly and to close automatically when said panel is lowered.

7. An automobile body provided with a front seat compartment, a hinged transparent panel arranged in front of the driver, a side closure for said compartment provided with a sliding window, and means operated by the movement of said panel for changing the position of said window.

EDWARD W. SAUNDERS.